United States Patent
Meier et al.

(10) Patent No.: US 8,780,947 B2
(45) Date of Patent: Jul. 15, 2014

(54) MIRROR ARRANGEMENT FOR GUIDING A LASER BEAM IN A LASER SYSTEM AND BEAM GUIDING METHOD FOR A LASER BEAM

(75) Inventors: Joachim Meier, Dornbirn (AT); Ulrike Wegner, Hamburg (DE); Maximilian Josef Lederer, Hamburg (DE)

(73) Assignee: High Q Laser GmbH, Rankweil (AT)

( * ) Notice: Subject to any disclaimer, the term of this patent is extended or adjusted under 35 U.S.C. 154(b) by 0 days.

(21) Appl. No.: 13/511,897

(22) PCT Filed: Nov. 19, 2010

(86) PCT No.: PCT/EP2010/067825
§ 371 (c)(1),
(2), (4) Date: Oct. 1, 2012

(87) PCT Pub. No.: WO2011/064147
PCT Pub. Date: Jun. 3, 2011

(65) Prior Publication Data
US 2013/0114631 A1      May 9, 2013

(30) Foreign Application Priority Data
Nov. 26, 2009   (EP) .................................. 09177261

(51) Int. Cl.
*H01S 3/10*      (2006.01)
(52) U.S. Cl.
USPC .................. 372/25; 372/93; 372/99; 359/838
(58) Field of Classification Search
USPC .......................................................... 372/25
See application file for complete search history.

(56) References Cited

U.S. PATENT DOCUMENTS 6,807,198 B1 * 10/2004 Furbach et al. ................. 372/18
2007/0223540 A1 * 9/2007 Sudmeyer et al. ............. 372/18

OTHER PUBLICATIONS

Kowalevicz Jr. et al. "Generation of 150-nJ pulses from a multiple-pass cavity Kerr-lens mode locked Ti:Al2O3 oscillator", Optics Letters, vol. 28, No. 17, Sep. 2003.*
Kowalevicz et al., "Generation of 150-nJ pulses from a multiple-pass cavity Kerr-lens mode-locked Ti:Al2O3 oscillator", Optics Letters, vol. 28, No. 17, Sep. 1, 2003, pp. 1597-1599.

(Continued)

*Primary Examiner* — Xinning Niu
(74) *Attorney, Agent, or Firm* — Muncy, Geissler, Olds & Lowe, P.C.

(57) ABSTRACT

The invention relates to a mirror arrangement for guiding a laser beam in a laser system having at least one first end mirror and one second end mirror, wherein said end mirrors define a resonator having an optical resonator axis, wherein the laser beam is guided into the resonator as an input laser beam and is guided out of the resonator again after multiple reflection at the first and second end mirrors as an output laser beam. The sequence of reflections at the first and second end mirror thereby determines a direction of rotation between the first and second end mirror, defined as an axis of rotation relative to the resonator axis, whereby a first beam path is defined and the laser beam circulates in a direction of rotation between the first and second end mirrors in the resonator defined as an axis of rotation relative to the resonator axis. The resonator is designed such that the direction of rotation is reversed at a reversing point and the laser beam in the resonator passes through at least partially in a direction of rotation opposite to the first beam path, whereby a second beam path is defined.

15 Claims, 6 Drawing Sheets

(56) References Cited

OTHER PUBLICATIONS

Sennaroglu et al., "Compact Femtosecond Lasers Based on Novel Multipass Cavities", IEEE Journal of Quantum Electronics, vol. 40, No. 5, May 1, 2004, pp. 519-528.

Kowalevicz et al., "Design principles of q-preserving multipass-cavity femtosecond lasers", J. Opt. Soc. Am. B, vol. 23, No. 4, Apr. 2006, pp. 760-770.

* cited by examiner

MIRROR ARRANGEMENT FOR GUIDING A LASER BEAM IN A LASER SYSTEM AND BEAM GUIDING METHOD FOR A LASER BEAM

This application is a national stage of International Application No.: PCT/EP2010/067825, which was filed on Nov. 19, 2010, and which claims priority to European Patent Application No.: 09177261.6, which was filed in Europe on Nov. 26, 2009, and which are both herein incorporated by reference in their entirety.

BACKGROUND OF THE INVENTION

1. Field of the Invention

The invention relates to a mirror arrangement for guiding a laser beam in a laser system in accordance with the preamble of claim 1, to a laser system having such a laser arrangement, and to a beam-guiding method for a laser beam in accordance with the preamble of claim 15.

2. Description of the Background Art

In laser systems for generating ultrashort pulses, that is to say pulses with a pulse duration in the femtosecond or picosecond range, there is often a need for large distances between the end mirrors, for example when low pulse repetition rates are necessary, that is to say typically less than ~30 MHz. Aside from the large length (>4 m), resonators of such laser systems are to have a compact design, high insensitivity to unintended adjustment of the optical elements, for example owing to temperature changes, mechanical vibrations etc., as well as the possibility of simple implementation.

An example of such laser systems is mode-coupled laser arrangements employing the principle of pulse decoupling or cavity dumping, for example with $Nd:YVO_4$ as laser material, and average powers of between 7.8 W and pulse energies of 15.6 µJ given repetition rates of 500 kHz and 10 W as well as 10 µJ given 1 MHz. Such laser systems are used, for example, for material processing.

Various methods are described in the prior art in the case of which two or more mirrors are arranged so that an optical beam or laser beam is reflected multiply between these mirrors, and it is thereby possible to increase the total path length on a small base surface.

These arrangements are usually named after the authors of the first reports, for example White cell (J. U. White, J. Opt. Soc. Am. 32, 285 (1942)), Hanst cell (P. L. Hanst, Adv. Environ. Sci. Technol. 2, 91 (1971)) or the likely most used cell, the Herriott cell (D. R. Herriott and H. J. Schulte, Appl. Opt. 4, 883 (1965) and U.S. Pat. No. 3,437,954). By way of example, the Herriott cell is described in more detail below.

Such a Herriott cell with multiple passes, or in a multipass arrangement, consists in the simplest arrangement of two mirrors as end mirrors defining the cell, at least one of them having a concave surface, which are arranged at a specified distance from one another. The mirror arrangement itself forms an optical resonator in which a beam is multiply reflected and repeats itself after a specific number of passes. There is formed in this case at the end mirrors a circulating pattern of reflection points lying on an ellipse or a circle. The beam is typically decoupled again from the mirror arrangement after a single pass of the cell, that is to say before the imminent identical repetition of the beam path. For the purpose of decoupling in the case of use in optical resonators, this closed beam path in the cell can be broken up either by separate mirrors or by holes at one of the end mirrors (see, for example, Kowalevicz et al., "Design principles of q-preserving multipass-cavity femtosecond lasers" J. Opt. Soc. Am. B, vol. 23, no. 4, April 2006).

Again, the publications of Kowalevicz et al. ("Generation of 150 nj pulses from a ultiple-pass cavity Kerr-lens mode-locked Ti:AL201 oscilator" Optic Letters Opt. Soc. Am., vol. 23, no. 17, September 2003) and Sennaroglu A, Fujimoto J. G. et al. ("Compact Femtosecond Lasers Based on Novel Multipass Cavities" IEEE Journal of Quantum Electronics, vol. 40, no. 5, May 2004) show examples for known Herriott cells with multiple passes, in the case of which, after a "circulation" (performed either clockwise or counterclockwise) of the reflection points on the end mirrors, a retroreflective element permits the beam to run back into itself.

Another beam-folding mirror arrangement is, for example, known from EP 1 588 461, in the case of which two reflecting planar surfaces are arranged so that the laser beam is multiply reflected at each of the reflecting surfaces, and the beam path has a beam entering the folding device and a beam exiting the folding device, the reflecting surfaces being oriented to one another with an aperture angle of greater than 0°. Such a linear arrangements leads therefore to a zig-zag profile of the beam path, the reflection points lying in a lines on the two reflecting surfaces, and having a varying spacing. In this arrangement, the space available for beam folding is therefore used only in a plane, that is to say in two dimensions.

In previous mirror arrangements, the number of the reflections is therefore restricted to one pass, or beam folding is performed only in a plane.

One object of the present invention consists in providing an improved laser system, in particular a diode-pumped, mode-coupled laser system.

A further object consists in providing such a laser system that has a greater compactness and/or greater robustness.

These objects are achieved, and/or the solutions are developed, by the subject matters of claims 1 and 15, or of the dependent claims.

SUMMARY OF THE INVENTION

The invention relates to a mirror arrangement for guiding a laser beam in a laser system, and a corresponding beam-guiding method for a laser beam. The mirror arrangement is based on at least two mirrors which, as end mirrors, define a resonator for folded beam guidance, and between which the beam path is guided to and fro multiply, reflections respectively occurring at the end mirrors. In this case, the beam path in the resonator can additionally be folded by the use of one or more further mirrors, so that the compactness of the arrangement, or of an overall design that uses this, can be further increased.

A laser beam is guided, or coupled, into this mirror arrangement so that said laser beam passes through a first beam path as part of the total beam path in the resonator. During this first pass, the beam path runs between the end mirrors, the reflection points occurring there lying on a circular line and being passed through in one direction of rotation, for example in a clockwise direction. After one pass, that is to say after the reaching of the point at which a renewed pass through the path or beam path already passed through, would occur, the beam is retroreflected with an angular change so that an identical or similar second beam path is passed through which, however, is offset or twisted with its reflection points on the end mirrors relative to the first beam path. If, for example, five reflections respectively occur at the end mirrors in the first beam path, the second beam path is preferably formed by retroreflection with angular change so that five reflection points likewise respectively occur on the end mirrors, it being possible for these to lie in the interspaces of the reflection point pattern of the first beam path. In this case, when the beam is guided back in or through the resonator, the direction of rotation is reversed so that the two beam paths are interlaced with one another with an opposite direction of rotation. This is based on an important finding which results from consideration of the beam pattern on the end mirrors. There is a pattern in the case of which the beams rotate clockwise, and the pattern with rotation in the counterclockwise sense, the two patterns otherwise having the same properties. It is therefore possible in principle to pass twice through a mirror arrangement with two end mirrors, or a Herriott cell. The two passes have the same properties except for the direction of rotation. The different angles render it possible to separate the beams.

Aside from this beam guidance for the two beam paths, which is similar but offset with regard to the reflections, by suitable selection of the retroreflection angle and/or further beam-influencing elements it is, however, also possible in principle to implement a larger number of reflection points for one of the two beam paths. Thus, four reflection points can occur on the two end mirrors in the first beam path, whereas the returning beam path is formed with twice the number of reflection points, that is to say in this case ten reflection points. Through an integral ratio of the reflection points between the beam paths, the latter can also still be interlaced with one another even given different numbers of reflection points.

Depending on the embodiment, in the case of the arrangements known from the prior art the points on the end mirrors are passed through either in the clockwise sense or counterclockwise sense before the beam returns into itself. By reversing the direction of rotation at the reversing points, however, the present invention permits the simultaneous use of the two directions of rotation, in conjunction with an increase in the number of reflection points, and thus an increase in the resonator length given the same overall size.

The coupling in or out of the laser beam can be fashioned by further mirror components.

BRIEF DESCRIPTION OF THE DRAWINGS

Exemplary embodiments of an inventive mirror arrangement and a corresponding method and a laser system using the mirror arrangement are illustrated schematically below and described in more detail purely by way of example. Of the individual figures.

FIGS. 1-8 shows the illustration of a first exemplary embodiment of the inventive mirror arrangement and of the inventive beam-guiding method for a laser beam, beam guidance being explained in various figures.

DETAILED DESCRIPTION

Figure 1:
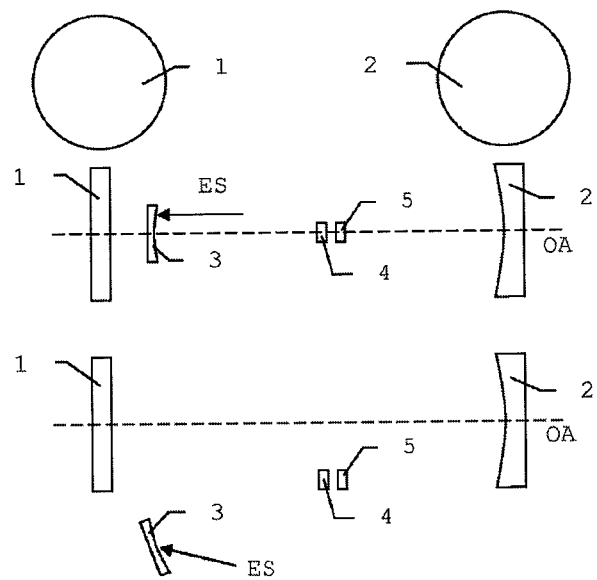
FIGS. 1-8 show the illustration of a first exemplary embodiment of the inventive mirror arrangement and of the inventive beam-guiding method for a laser beam.

FIG. 1 illustrates the situation of coupling a laser beam in to the resonator as input laser beam ES, said resonator being formed as a Herriott cell from at least a first end mirror 1 and a second end mirror 2 with a concave surface. The arrangement of the two end mirrors 1 and 2 that is illustrated in this exemplary embodiment is selected purely by way of example. In particular, the two mirrors can also in principle have their positions interchanged. Running between the two end mirrors is an optical resonator axis OA connecting them, said axis being illustrated as a straight line in this example. In folded arrangements, the optical resonator axis OA can also, however, have a correspondingly folded, that is to say angled profile. Placed upstream of the resonator is a focusing mirror 3 for the input laser beam ES and the output laser beam AS.

Figure 2:
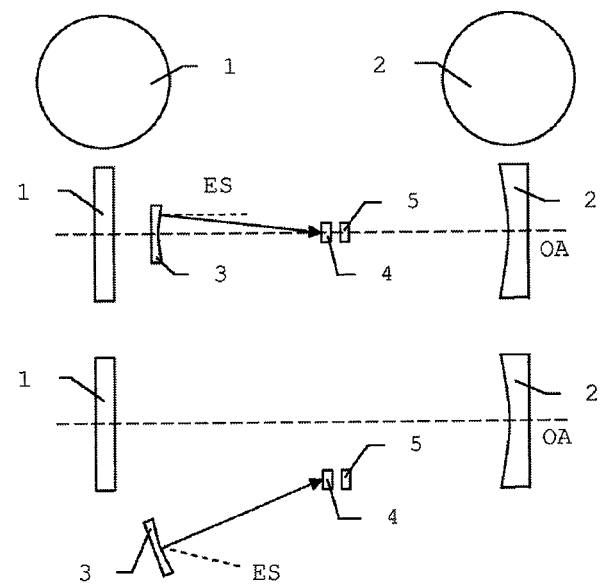

As is shown in FIG. 2, said focusing mirror 3 directs the laser beam onto a coupling-in mirror 4, and thus into the actual resonator, the axis of the focusing mirror 3 lying in a plane with the resonator axis OA.

Figure 3:
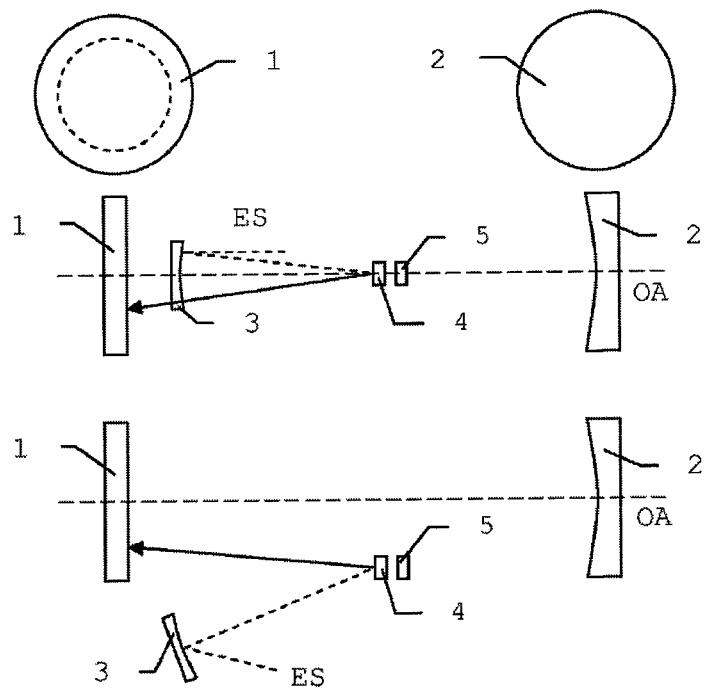
Figure 4:
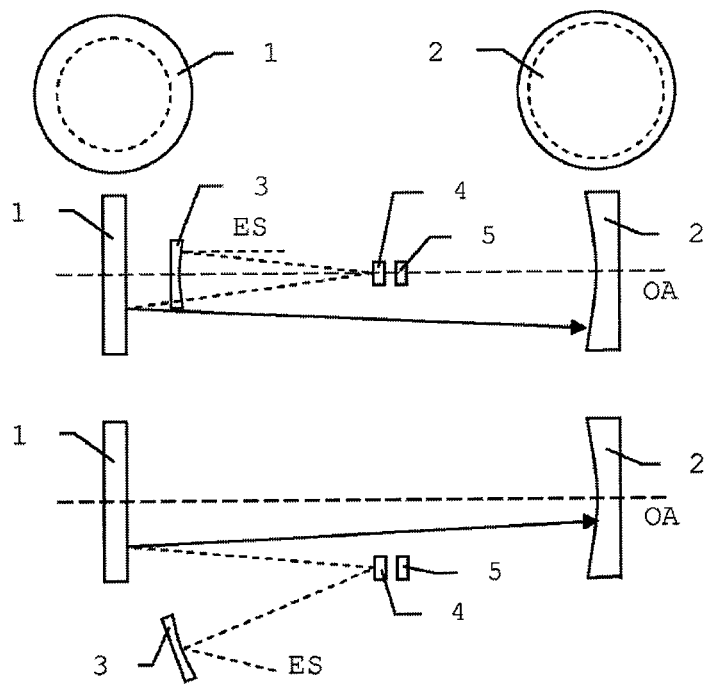

As illustrated in FIG. 3, the laser beam is subsequently guided onto the first end mirror 1 by way coupling-in mirror 4 and, as shown in FIG. 4, is guided thereafter onto the second end mirror 2.

Figure 5:
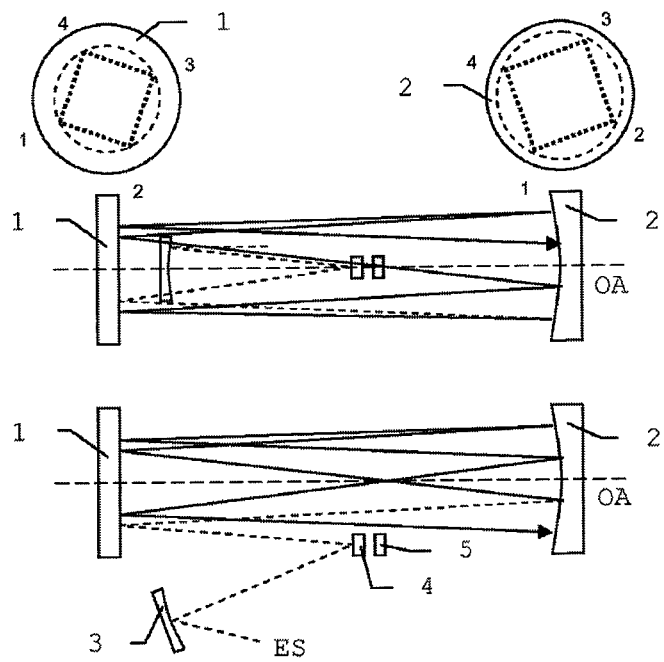

As shown in FIG. 5, a multiple reflection occurs respectively at the first and the second end mirrors 1, 2, four reflection points occurring on the end mirrors 1, 2 in this example and forming a pattern in which the reflection points lie at the corner points of a square. The sequence of the reflections at the first and the second end mirrors 1, 2 hereby defines a direction of rotation relative to the resonator axis OA as axis of rotation. The totality of the reflections and the beam segments lying therebetween in this case form a first beam path with a defined direction of rotation, said beam path being capable of running in a clockwise or counterclockwise sense. The laser beam therefore runs to and fro, or circulates, between the first and second end mirrors in the resonator with a defined direction of rotation.

Figure 6:
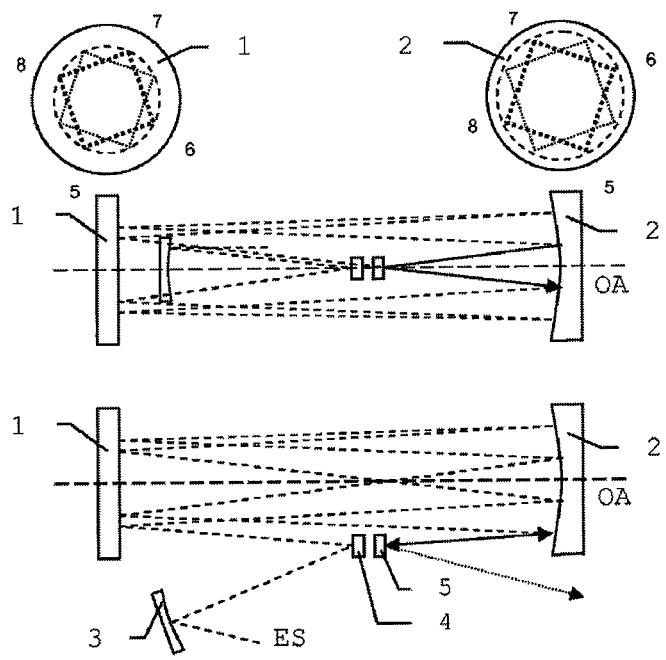

By contrast with a regular Herriott cell and/or mirror arrangements of the prior art, the resonator is designed so that the direction of rotation is reversed or inverted at a reversing point and the laser beam passes through in the resonator at least partially in a direction of rotation opposite to the first beam path, a second beam path being defined thereby. This situation is illustrated in FIG. 6, this exemplary embodiment making use of an inverter mirror 5 to produce the reversing point so that, after the first beam path has been passed through, said mirror effects a retroreflection initiating the change in direction of rotation or sense of rotation. In conventional Herriott cells, the laser beam is decoupled from the arrangement at this point, this being indicated in FIG. 6 by the dotted arrow.

Figure 7:
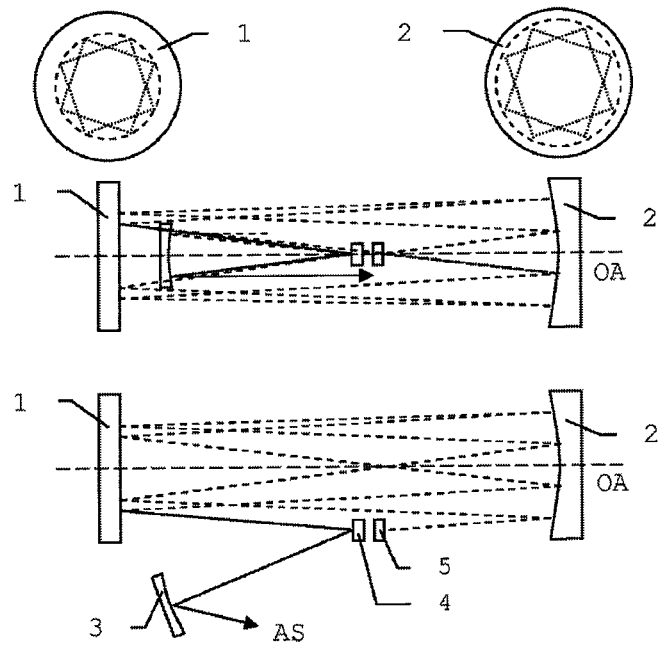

As illustrated in FIG. 7, the laser beam now passes through the resonator anew in a second beam path having a changed or inverted direction of rotation, first and second beam paths being separated in space. The first and second beam paths thereby form a closed and self-repeating common beam path, which would be passed through anew in the case of a retroreflection at the beginning of the first beam path. On the end mirrors 1, 2, the first and the second beam paths have the same number of reflection points in this case, in particular three, four or five reflection points that lie on each of the two end mirrors 1, 2 on a common circular line. In this case, owing to the reflection at the inverter mirror 5, the position of the reflection points of the first and second beam paths are mutually offset on the first and second end mirrors 1, 2, or are rotated about the resonator axis OA. In this example, the laser beam passes through the pattern of reflection points shown in FIG. 5 and FIG. 6 for the two end mirrors 1, 2 and beam paths, doing so respectively in the sequence of the reflection points 1-8. Opposite directions of rotation result in this case owing to the different directions of the two beam paths.

Figure 8:
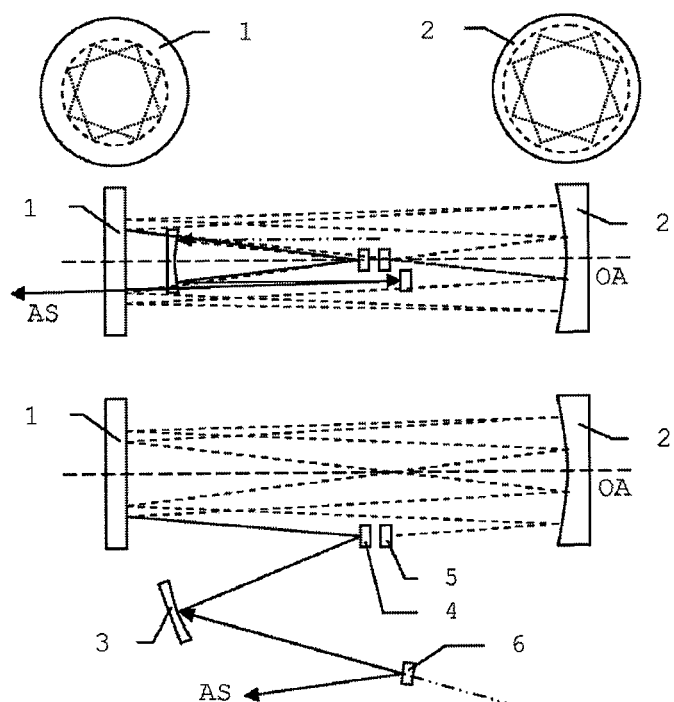

After passing through the second beam path, the laser beam is finally guided out of the resonator again as output laser beam AS, this being shown in FIG. 7. The focusing mirror 3 is arranged in this case so as to effect a beam offset, parallel to the resonator axis OA, of the output laser beam AS after passing through the second beam path. In addition, the resonator or the mirror arrangement can have a separation mirror 6 that is shown in FIG. 8 and which separates the input laser beam ES and the output laser beam AS.

Figure 9:
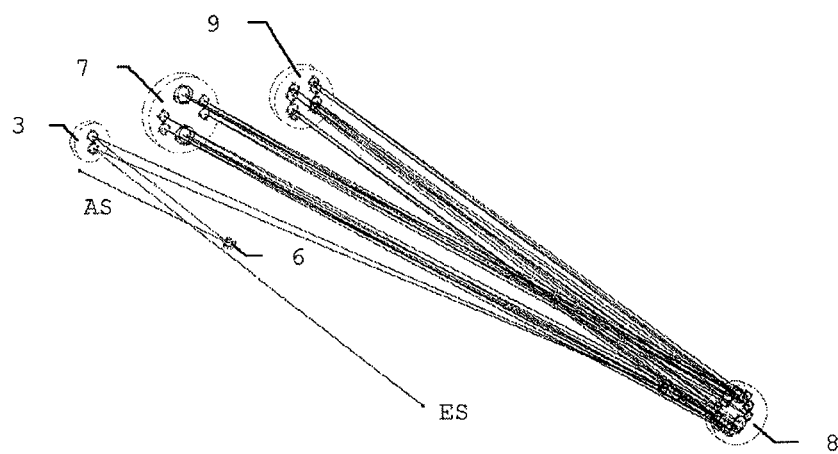
FIGS. 9-10 show the illustration of a second exemplary embodiment of the inventive mirror arrangement with a folding mirror.
Figure 10:
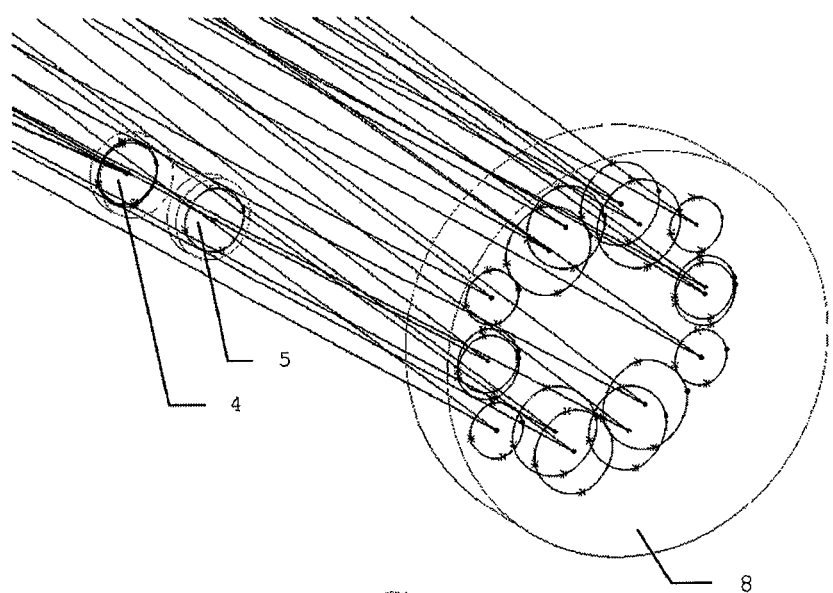

FIGS. 9-10 show the illustration of a second exemplary embodiment of the inventive mirror arrangement having a folding mirror 8 that jointly folds the first and second paths. In this illustration implemented for the laser system shown in FIG. 11, a Herriott cell consisting of three mirrors 7, 8, 9 is used in order to obtain a yet more compact design. The input resonater beam ES is, once again, focused onto the coupling-in mirror 4 by the focusing mirror 3 as curved mirror, and then runs clockwise once through the resonator of the mirror arrangement. After the last reflection at the folding mirror 8, the beam strikes the inverter mirror 5 and is now sent once more, in the counterclockwise sense, through the resonator. At the end of the second beam path, and thus of the second rotation, the laser beam strikes the coupling-in mirror anew, but at a reversed angle. This leads after expansion and reflection by the focusing mirror 3 to a spatial separation of input and output laser beams ES, AS, respectively. A downstream small separation mirror 6 is used in order to simplify access to the output laser beam AS.

Figure 11:
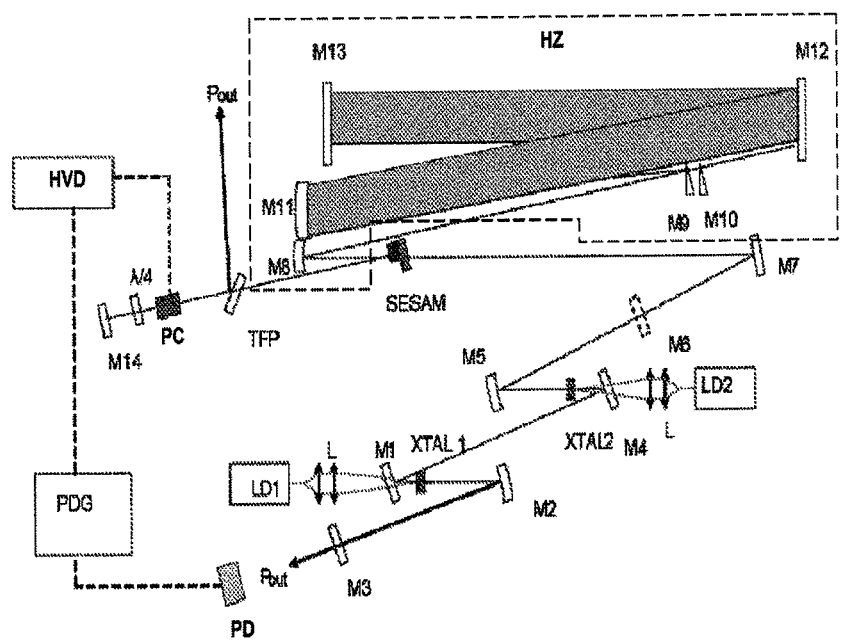
FIG. 11 shows the illustration of a laser system with the second exemplary embodiment of the inventive mirror arrangement.

The integration of the second exemplary embodiment of the inventive mirror arrangement in an exemplary laser system for generating or amplifying femtosecond pulses or picoseconds pulses is shown in FIG. 11. The laser system is designed as mode-coupled laser arrangements based on the principle of pulse decoupling or cavity dumping, with Nd:YVO$_4$ crystals as laser media XTAL1 and XTAL2. In this case, use is made of a saturable absorber mirror SESAM to produce mode coupling, of a Pockels cell PC with a quarter-wavelength plate $\lambda/4$, and of a thin-film polarizer TFP as pulse decoupling components, as well as laser diode sources LD1 and LD2 for pumping the laser media XTAL1 and XTAL2. Further components that are used are a photodiode PD, a pulse delay generator PDG and a high voltage supply HVD for the BBO Pockels cell PC, as well as mirror elements M1 to M13, the Herriott cell HZ shown in FIGS. 9 and 10 being formed by the mirror elements M8-M13, and the mirror element M3 constituting the coupling-out mirror of the laser system. By contrast, the mirror elements M9 and M10 are used as coupling-in and coupling-out mirrors for the Herriott cell, the mirror element M8 serving as focusing mirror. The mirror element M11 serving as second end mirror of the Herriott cell has a radius of curvature of 1600 mm, whereas the mirror elements M12 and M13 serving as first end mirror and folding mirror are of flat design. The mirror elements M1 and M4 are dichroic mirrors that serve as pump arrangements in conjunction with the fiber-coupled laser diode sources LD1 and LD2. Powers of between 7.8 W given repetition rates of 500 kHz and 10 W given 1 MHz are achieved with this arrangement.

However, the laser system illustrated constitutes only one example of the use of an inventive mirror arrangement, and so use of the latter is not restricted thereto. It is possible in principle to apply the inventive mirror arrangement and/or the inventive beam-guiding method for a laser beam in a multiplicity of laser systems when a compact and/or robust resonator or an integration of large beam segments in a restricted space is intended to take place there.

What is claimed is:

1. A mirror arrangement for guiding a laser beam in a laser system, in particular a laser system for generating femtosecond pulses or picosecond pulses, having at least
   one first end mirror, and
   one second end mirror with a concave surface,
in which
   the first and the second end mirrors form a resonator having an optical resonator axis connecting the end mirrors,
   the laser beam is guided as input laser beam into the resonator, and is guided out of the resonator again after multiple reflection at, respectively, the first and the second end mirrors as output laser beam, and
   the sequence of the reflections at the first and the second end mirrors fixes a direction of rotation, defined as axis of rotation relative to the resonator axis, between the first and second end mirrors in the resonator, a first beam path being defined thereby,
   wherein the resonator is designed such that the direction of rotation is reversed at a reversing point by retroreflection with an angular change so that an identical or similar second beam path is at least partially passed through, said second beam path is offset or twisted with its reflection points on the end mirrors relative to the first beam path and the laser beam passes through the resonator at least partially in a direction of rotation opposite to the first beam path.

2. The mirror arrangement as claimed in claim 1, Wherein the resonator is designed as a Herriott cell.

3. The mirror arrangement as claimed in claim 1 Wherein the first and second beam paths are separated in space.

4. The mirror arrangement as claimed in claim 1, Wherein the first and second beam paths form a closed and self-repeating common beam path.

5. The mirror arrangement as claimed in claim 1 comprising:
   an in-coupling mirror upstream of the first and/or the second end mirror(s).

6. The mirror arrangement as claimed in claim 1 comprising:
   an inverter mirror for producing the reversing point, a reflection that changes the direction of rotation taking place at the inverter mirror after the first beam path has been passed through.

7. The mirror arrangement as claimed in claim 1 further comprising:
   the first and the second beam path have the same number of reflection points, in particular 3, 4 or 5 reflection points, on the first and the second end mirrors respectively.

8. The mirror arrangement as claimed in claim 6, further comprising:
   owing to the reflection at the inverter mirror, the position of the reflection points of the first and second beam paths are mutually offset on the first and second end mirrors, in particular are rotated about the resonator axis.

9. The mirror arrangement as claimed in claim 1 comprising:
   a focusing mirror for the input laser beam and/or output laser beam, in particular the optical axis of the focusing mirror lying in a plane with the optical resonator axis.

10. The mirror arrangement as claimed in claim 9, further comprising:
    the focusing mirror is arranged so that after the second beam path has been passed through said focusing mirror effects a beam offset parallel to the resonator axis for the output laser beam.

11. The mirror arrangement as claimed in claim 1 further comprising:
the resonator has at least one folding mirror that jointly folds the first and second beam path.

12. The mirror arrangement as claimed in claim 1 further comprising:
the resonator has at least one separation mirror that separates the input laser beam and the output laser beam.

13. A laser system for generating or amplifying femtosecond pulses or picoseconds pulses, having a mirror arrangement as claimed in any one of the preceding claims.

14. The laser system as claimed in claim 13, comprising:
a saturable absorber mirror for producing mode coupling,
a pulse decoupling component, in particular an electro-optic modulator,
a laser medium, in particular made from $Nd:YVO_4$, and
a laser diode source for pumping the laser medium.

15. A guiding method for a laser beam in a laser system, in particular a laser system for generating femtosecond pulses or picoseconds pulses, having at least
one first end mirror, and
one second end mirror with a concave surface,
in which
the first and the second end mirrors form a resonator having an optical resonator axis connecting the end mirrors comprising:
guiding of the laser beam as input laser beam into the resonator,
decoupling of the laser beam after multiple reflection at, respectively, the first and the second end mirrors as output laser beam, and in which the sequence of the reflections at the first and the second end mirrors fixes a direction of rotation, defined as axis of rotation relative to the resonator axis, between the first and second end mirrors in the resonator, a first beam path being defined thereby, such that the beam circulates in the resonator in the direction of rotation between the first and second end mirrors in a direction of rotation defined as axis of rotation relative to the resonator axis, further comprising:
the direction of rotation is reversed at a reversing point by retroreflection with an angular change so that an identical or similar second beam path is at least partially passed through, said second beam path is offset or twisted with its reflection points on the end mirrors relative to the first beam path and the laser beam passes through the resonator at least partially in a direction of rotation opposite to the first beam path.

* * * * *